United States Patent
Hsu et al.

(10) Patent No.: US 9,827,814 B2
(45) Date of Patent: Nov. 28, 2017

(54) TIRE PRESSURE MONITORING DEVICE AND CARRIER MODULE THEREOF

(71) Applicant: ICHIA TECHNOLOGIES, INC., Taoyuan (TW)

(72) Inventors: Chih-Hao Hsu, Taoyuan (TW); Chung-Hsin Yang, New Taipei (TW); Chih-Pin Lin, New Taipei (TW); Shih-Fu Yu, Taipei (TW); Wei-Tsen Yen, New Taipei (TW)

(73) Assignee: ICHIA TECHNOLOGIES, INC., Taoyuan (TW)

( * ) Notice: Subject to any disclaimer, the term of this patent is extended or adjusted under 35 U.S.C. 154(b) by 73 days.

(21) Appl. No.: 15/131,525

(22) Filed: Apr. 18, 2016

(65) Prior Publication Data
US 2017/0297386 A1    Oct. 19, 2017

(51) Int. Cl.
*B60C 23/00*    (2006.01)
*B60C 23/04*    (2006.01)

(52) U.S. Cl.
CPC ...... *B60C 23/0491* (2013.01); *B60C 23/0447* (2013.01)

(58) Field of Classification Search
CPC ............ B60C 23/0408; B60C 23/0496; B60C 23/0452; B60C 23/0498; G01L 17/00
USPC ......................... 340/442, 447; 73/146–146.8
See application file for complete search history.

(56) References Cited

U.S. PATENT DOCUMENTS

| 5,781,104 | A  | * | 7/1998 | Huang | B60C 23/0408 340/447 |
| 5,889,464 | A  | * | 3/1999 | Huang | B60C 23/0411 340/447 |
| 7,107,830 | B1 | * | 9/2006 | Yu | B60C 23/0408 73/146 |
| 9,310,277 | B2 | * | 4/2016 | Peng | G01M 17/02 |
| 9,321,314 | B2 | * | 4/2016 | Peng | B60C 23/0496 |
| 2009/0071238 | A1 | * | 3/2009 | Crano | B60C 23/0498 73/146.5 |
| 2015/0224832 | A1 | * | 8/2015 | Hsiao | B60C 23/0496 73/146.8 |

* cited by examiner

*Primary Examiner* — Eric M Blount
(74) *Attorney, Agent, or Firm* — Li & Cai Intellectual Property (USA) Office

(57) ABSTRACT

A carrier module of a tire pressure monitoring device includes a plastic carrier and a metallic tube. The plastic carrier has a trough and a tube extended from a bottom portion of the trough. The trough has an airflow channel penetratingly formed on the bottom portion thereof, and the trough is in air communication with the tube by the airflow channel The metallic tube is seamlessly formed on an inner surface of the tube of the plastic carrier. The metallic tube has an inner screw thread formed on an inner surface thereof for detachably screwing to a nozzle of a tire. Thus, by seamlessly forming the metallic tube on the inner surface of the tube of the plastic carrier, the tire pressure monitoring device of the instant disclosure has a better airproof effect and a longer service life.

10 Claims, 11 Drawing Sheets

TIRE PRESSURE MONITORING DEVICE AND CARRIER MODULE THEREOF

BACKGROUND OF THE INVENTION

1. Field of the Invention

The instant invention relates to a sensing device; in particular, to a tire pressure monitoring device and a carrier module thereof.

2. Description of Related Art

A conventional tire pressure monitoring system (TPMS) includes a tire pressure monitoring device for sensing a tire and a display device for showing status of the tire. The tire pressure data obtained by the tire pressure monitoring device is transmitted to the display device by using a radio frequency (RF) transmission, thereby the display device can immediately show the pressure of the tire. However, the housing of the conventional tire pressure monitoring device is made of a single material (e.g., plastic), such that when the housing of the conventional tire pressure monitoring device is screwed to a nozzle of the tire, the airproof effect between the housing and the nozzle is not very good.

SUMMARY OF THE INVENTION

The instant disclosure provides a tire pressure monitoring device and a carrier module thereof for effectively solving the problem generated by the conventional tire pressure monitoring device.

The instant disclosure provides a tire pressure monitoring device, comprising: a carrier module, comprising: a plastic carrier having a trough and a tube extended from a bottom portion of the trough, wherein the trough has an airflow channel penetratingly formed on the bottom portion thereof, and the trough is in air communication with the tube by the airflow channel; and a metallic tube seamlessly formed on an inner surface of the tube of the plastic carrier, wherein the metallic tube has an inner screw thread formed on an inner surface thereof for detachably screwing to a nozzle of a tire; a sensing module, comprising: a circuit board disposed in the trough; and a sensor mounted on the circuit board and facing toward the airflow channel; a cover detachably installed on the carrier module, wherein the cover and the trough of the plastic carrier surroundingly define an accommodating space; and a conductive module arranged in the accommodating space and electrically connected to the sensor of the sensing module.

The instant disclosure also provides a carrier module of a tire pressure monitoring device, comprising: a plastic carrier having a trough and a tube extended from a bottom portion of the trough, wherein the trough has an airflow channel penetratingly formed on the bottom portion thereof, and the trough is in air communication with the tube by the airflow channel; and a metallic tube seamlessly formed on an inner surface of the tube of the plastic carrier, wherein the metallic tube has an inner screw thread formed on an inner surface thereof for detachably screwing to a nozzle of a tire.

In summary, each of the tire pressure monitoring device and the carrier module thereof in the instant disclosure is provided with the plastic carrier and the metallic tube, which are formed in an single-piece structure by using an insert molding method, so a main portion of the single-piece structure is the plastic carrier for preventing electrical interference from occurring during signal transmission, and a screwing portion of the single-piece structure is the metallic tube for causing the carrier module to have a better airproof effect and a longer service life.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Please refer to FIGS. 1 through 11, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
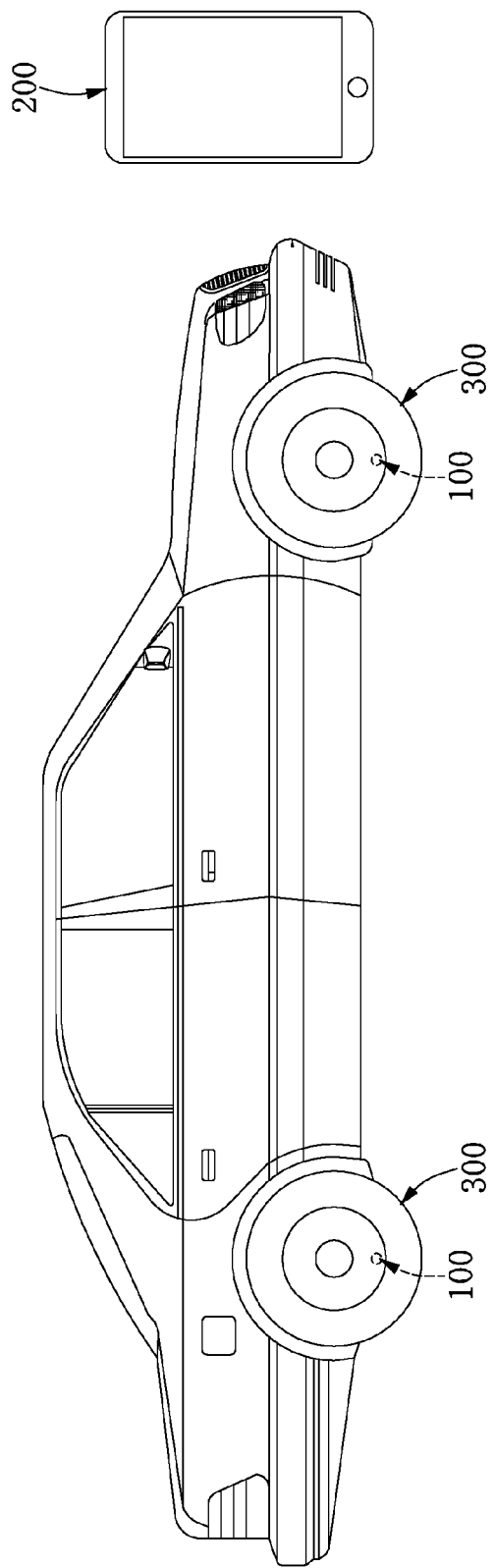
FIG. 1 is a schematic view showing a tire pressure monitoring system, which is applied to a car, according to the instant disclosure.
Figure 2:
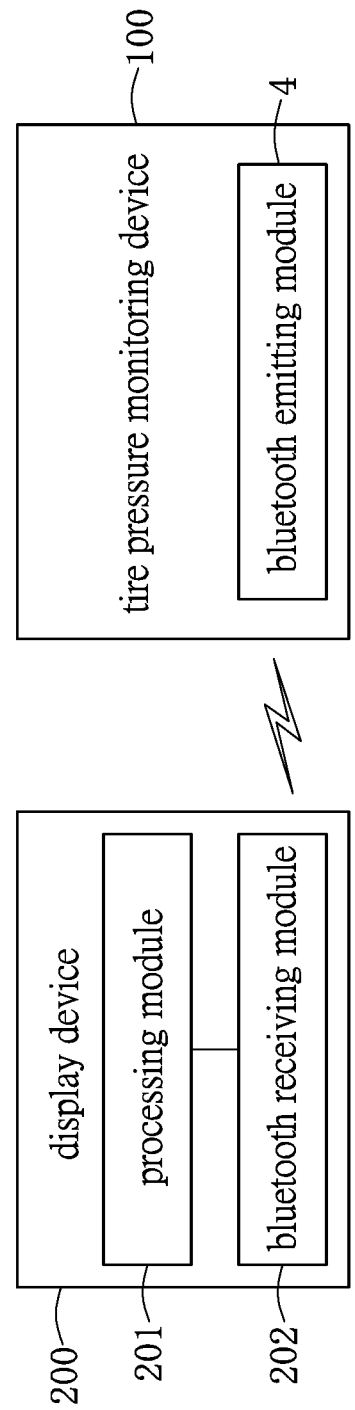
FIG. 2 is a functional block view of the tire pressure monitoring system of the instant disclosure.

As shown in FIGS. 1 and 2, the instant embodiment provides a tire pressure monitoring system (TPMS). The TPMS in the instant embodiment is operated by using Bluetooth transmission, but is not limited thereto. The TPMS includes a display device 200 and at least one tire pressure monitoring device 100. The tire pressure monitoring device 100 in the instant embodiment is wirelessly connected to the display device 200 by using Bluetooth transmission, but is not limited thereto. For example, the tire pressure monitoring device 100 can be wirelessly connected to the display device 200 by using RF transmission.

The display device 200 has a processing module 201 and a Bluetooth receiving module 202 electrically connected to the processing module 201. The processing module 201 includes a processor, a storage unit, a memory, and the other electronic components for selectively downloading an application (APP). Specifically, the display device 200 in the instant embodiment is a mobile device (e.g., smart phone or tablet PC) or a screen built-in a car, so the display device 200 is different from the conventional display device of the conventional TPMS, which is only used to show a tire pressure. In other words, a user's electronic device (e.g., smart phone) can be used to be the display device 200 by downloading a specific APP, so the user needs not to buy the conventional display device.

Figure 3:
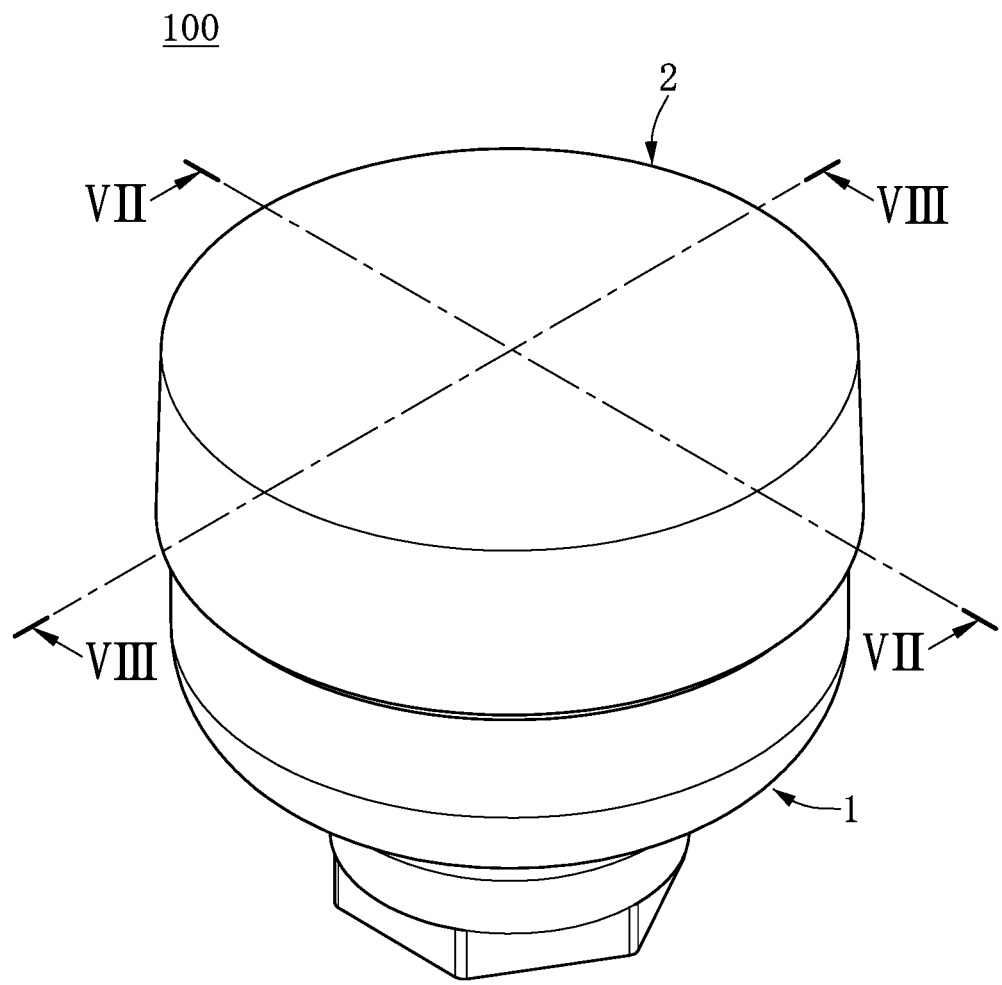
FIG. 3 is a perspective view of a tire pressure monitoring device of the instant disclosure.
Figure 4:
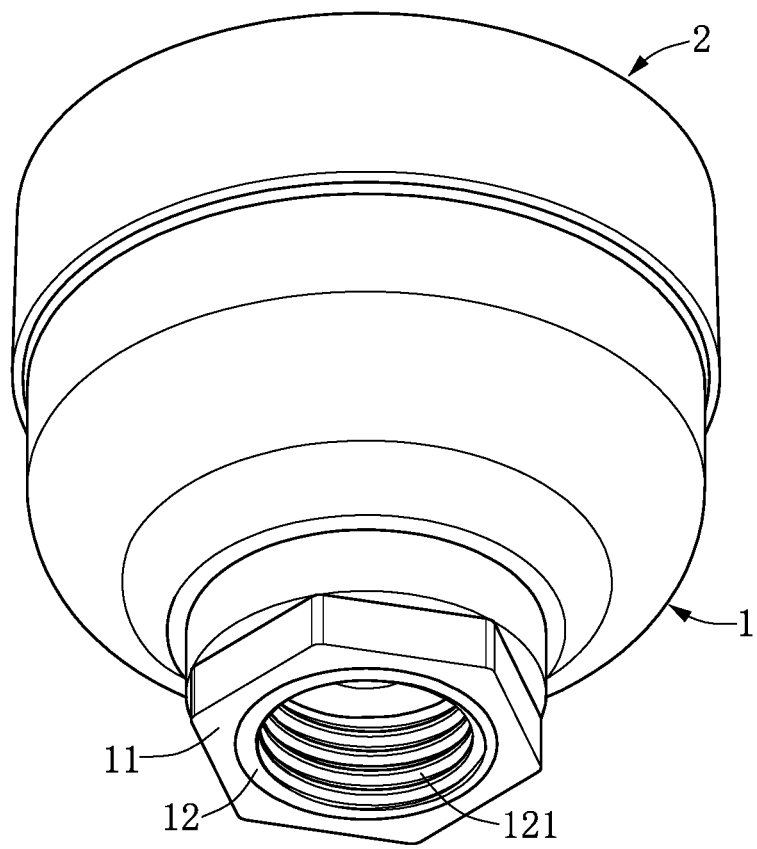
FIG. 4 is a perspective view of FIG. 3 from another perspective.

The tire pressure monitoring device 100 is provided to detachably install on a tire 300 for sensing pressure of the tire 300, but the tire pressure monitoring device 100 is not limited thereto. For example, the tire pressure monitoring device 100 can be used to sense temperature of the tire 300, battery power of a car, or battery power of the tire pressure monitoring device 100. The tire pressure monitoring device 100 has a Bluetooth emitting module 4 for transmitting the pressure data of the tire 300 to the Bluetooth receiving module 202 of the display device 200, so the display device 200 can show the pressure value of the tire 300 by using a corresponding APP. Thus, the tire pressure monitoring device 100 in the instant embodiment is provided with the Bluetooth emitting module 4 to cooperate with the Bluetooth receiving module 202 of the display device 200, thereby maintaining a low energy operation. Moreover, the following description discloses the tire pressure monitoring device 100 (as shown in FIGS. 3 and 4) provided for arranging on a tire, but the tire pressure monitoring device 100 in the instant disclosure can be adjusted to be arranged in a tire.

Figure 5:
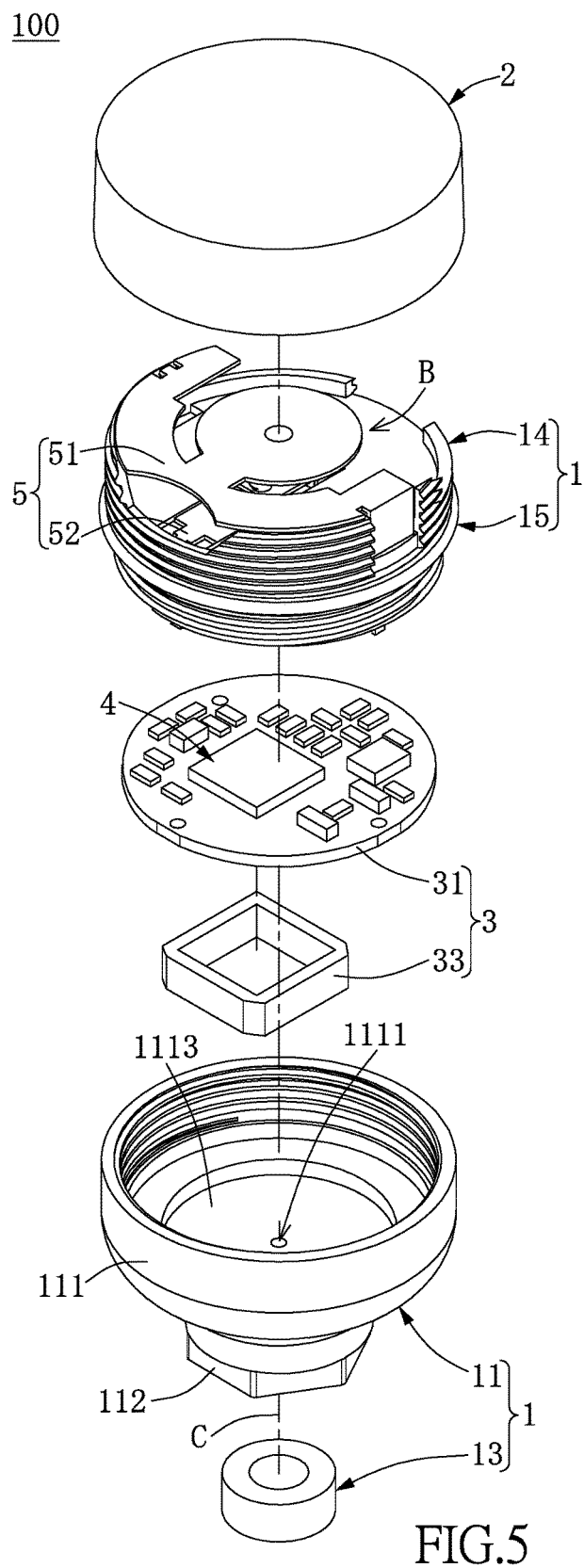
FIG. 5 is an exploded view of FIG. 3
Figure 6:
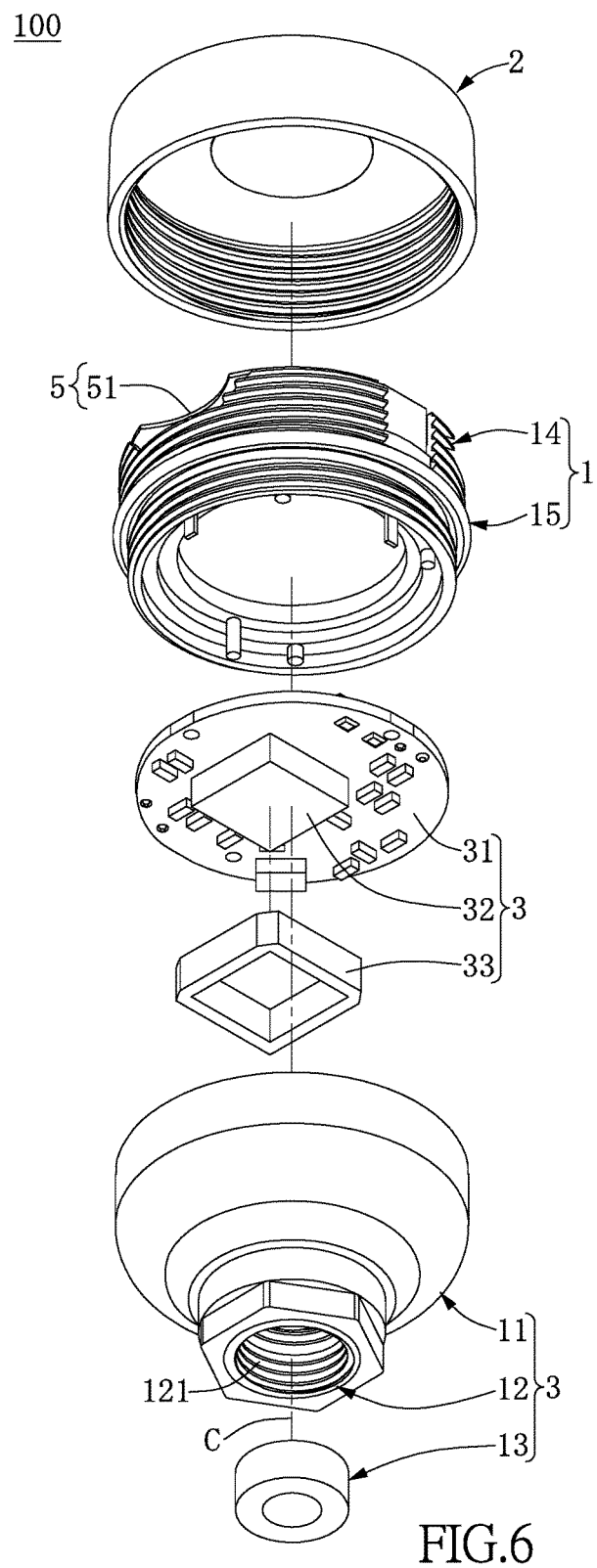
FIG. 6 is an exploded view of FIG. 4.
Figure 7:
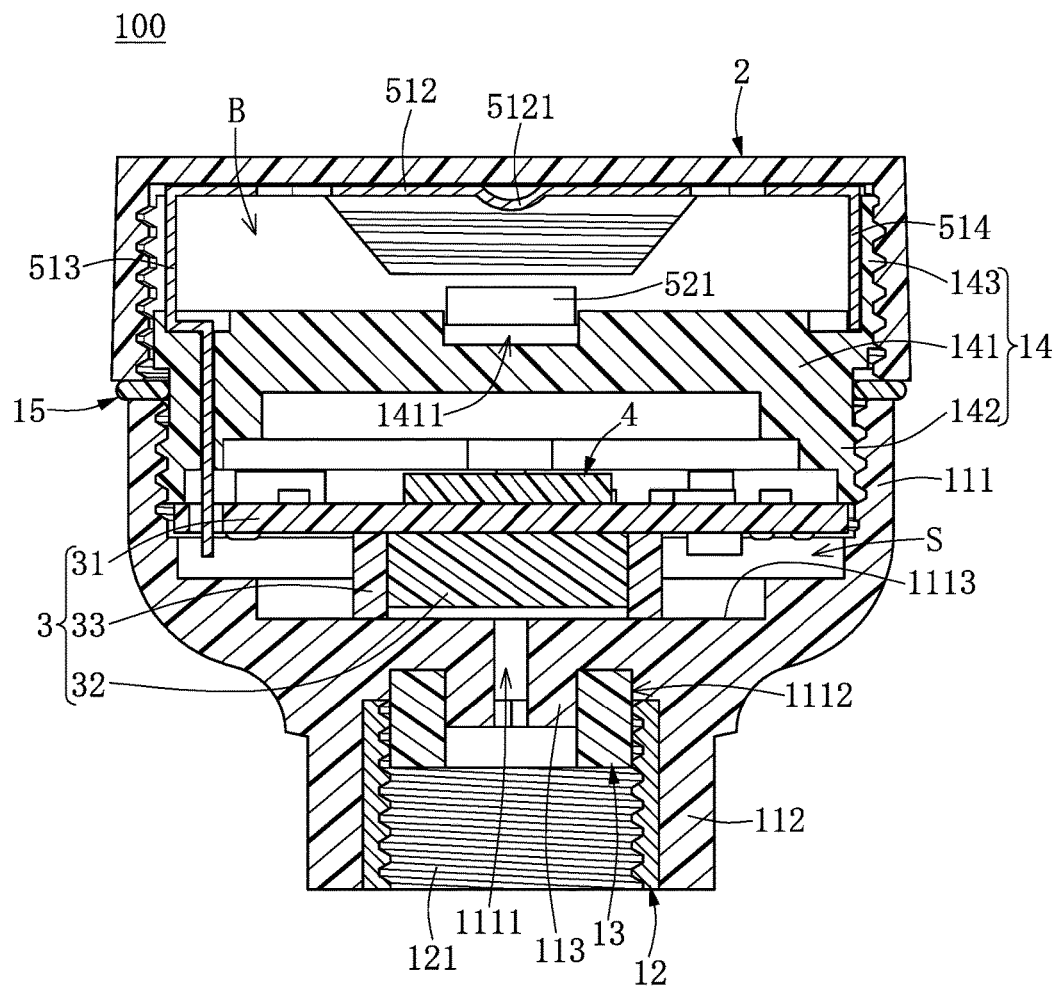
FIG. 7 is a cross-sectional view of FIG. 3 along a cross-sectional line VII-VII.
Figure 8:
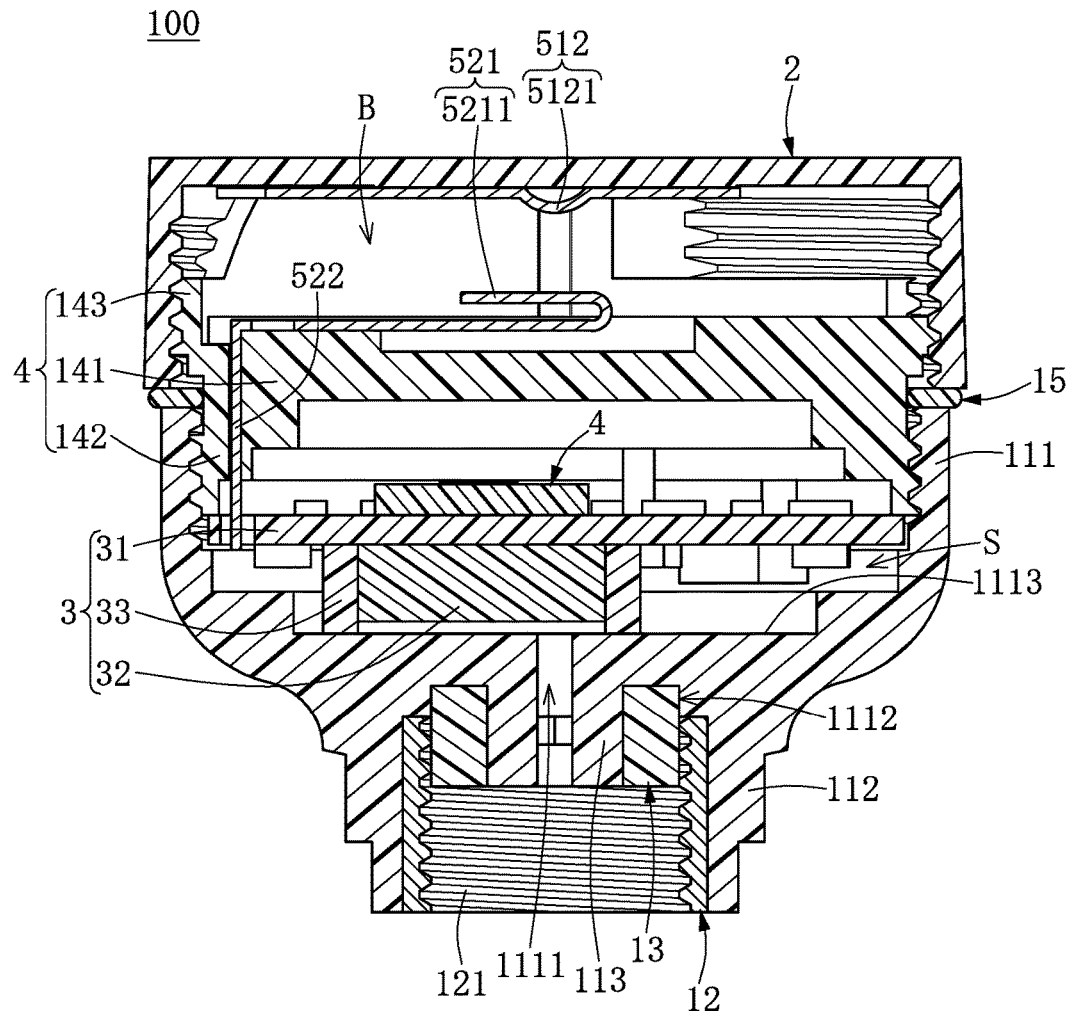
FIG. 8 is a cross-sectional view of FIG. 3 along a cross-sectional line VIII -VIII.

As shown in FIGS. 5 and 6, and with reference occasionally made to FIGS. 7 and 8, the tire pressure monitoring device 100 includes a carrier module 1, a cover 2, a sensing module 3, a Bluetooth emitting module 4, and a conductive module 5. The cover 2 is detachably installed on the carrier module 1, and the cover 2 and the carrier module 1 surroundingly define an accommodating space S (as shown in FIG. 7). The sensing module 3, the Bluetooth emitting module 4, and the conductive module 5 are arranged in the accommodating space S.

The carrier module 1 includes a plastic carrier 11, a metallic tube 12, a buffering gasket 13, a frame 14, and an O-ring 15. The plastic carrier 11 and the metallic tube 12 are formed in a single-piece structure by using an insert molding method. The buffering gasket 13 is disposed on the plastic carrier 11, and the frame 14 is detachably connected to the plastic carrier 11 and the cover 2. The cover 2 and the plastic carrier 11 clamp the O-ring 15 for preventing water and dust from permeating into the accommodating space S through a connecting area between the cover 2 and the plastic carrier 11.

Specifically, the plastic carrier 11 is approximately symmetrical to a central axis C, and the plastic carrier 11 has a bowl-shaped trough 111, a tube 112, and an airflow pipe 113 (shown in FIG. 7). The tube 112 and the airflow pipe 113 are extended from a bottom portion of the trough 111 away from the accommodating space S, and the airflow pipe 113 is arranged in the tube 112. An inner surface of a side wall of the trough 111 has a screw thread. The trough 111 has an airflow channel 1111 penetratingly formed on the bottom portion thereof, and the airflow channel 1111 is in air communication with the airflow pipe 113, so the accommodating space S can be in air communication with the tube 112 and the airflow pipe 113 through the airflow channel 1111. An outer surface of a portion of the tube 112 arranged away from the trough 112 has a hexagonal shape. A length of the tube 112 is greater than (at least double of) a length of the airflow pipe 113. The bottom portion of the trough 111 has an annular engaging groove 1112 (as shown in FIG. 7) arranged adjacent to the airflow pipe 113.

The metallic tube 12 is seamlessly formed on an inner surface of the tube 112 of the plastic carrier 11, in other words, the tube 112 is integrally formed on the outer surface of the metallic tube 12 by using an insert molding method.

The metallic tube 12 has an inner screw thread 121 formed on an inner surface thereof for detachably screwing to a nozzle (not shown) of a tire. The buffering gasket 13 is sleeved at the airflow pipe 113 arranged in the metallic tube 12, and part of the buffering gasket 13 is engaged in the engaging groove 1112 of the plastic carrier 11. The other part of the buffering gasket 13, which is not engaged in the engaging groove 1112, is abutted against the inner screw thread 121 of the metallic tube 12 by an outer surface thereof.

Accordingly, the plastic carrier 11 and the metallic tube 12 in the instant embodiment are formed in a single-piece structure by using an insert molding method, so a main portion of the single-piece structure is the plastic carrier 11 for preventing electrical interference from occurring during signal transmission, and a screwing portion of the single-piece structure is the metallic tube 12 for causing the carrier module 1 to have a better airproof effect and a longer service life.

Figure 9:
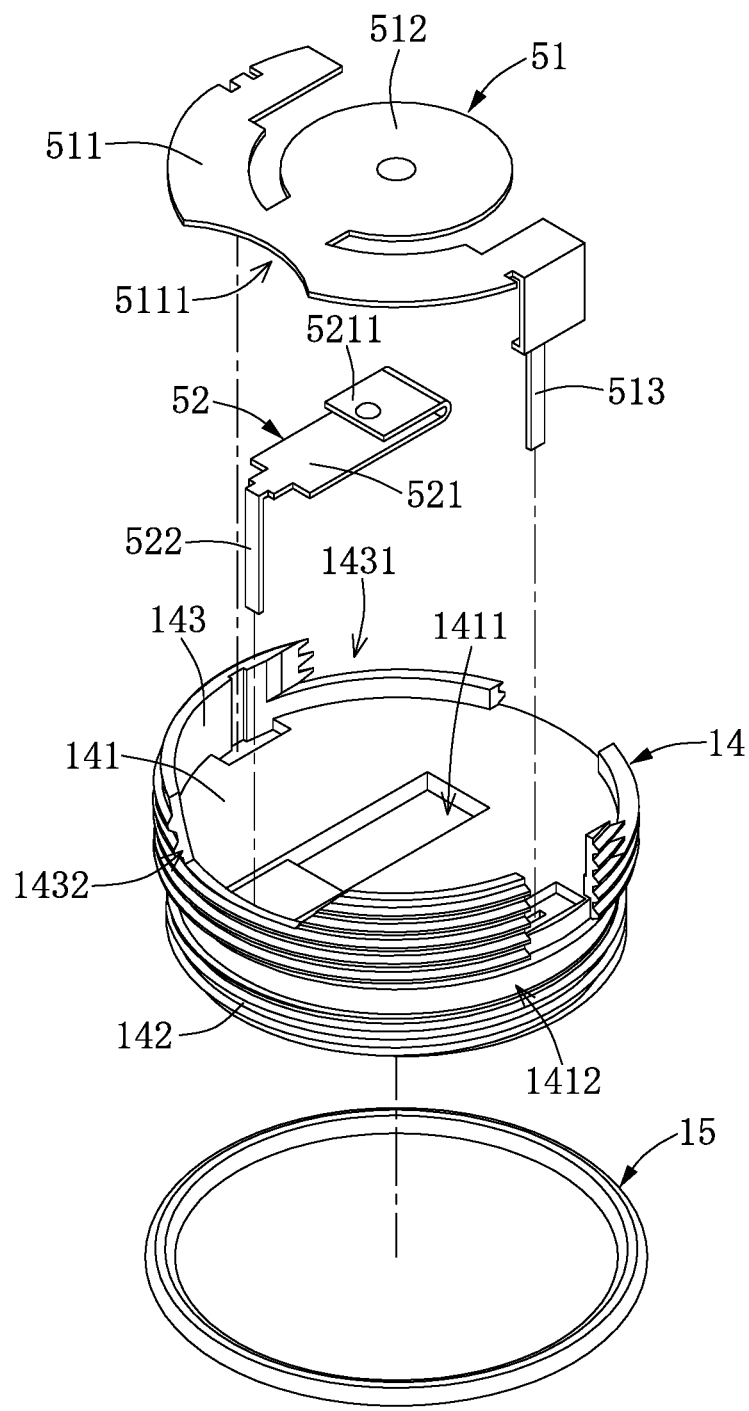
FIG. 9 is an exploded view showing part of the tire pressure monitoring device of the instant disclosure.
Figure 10:
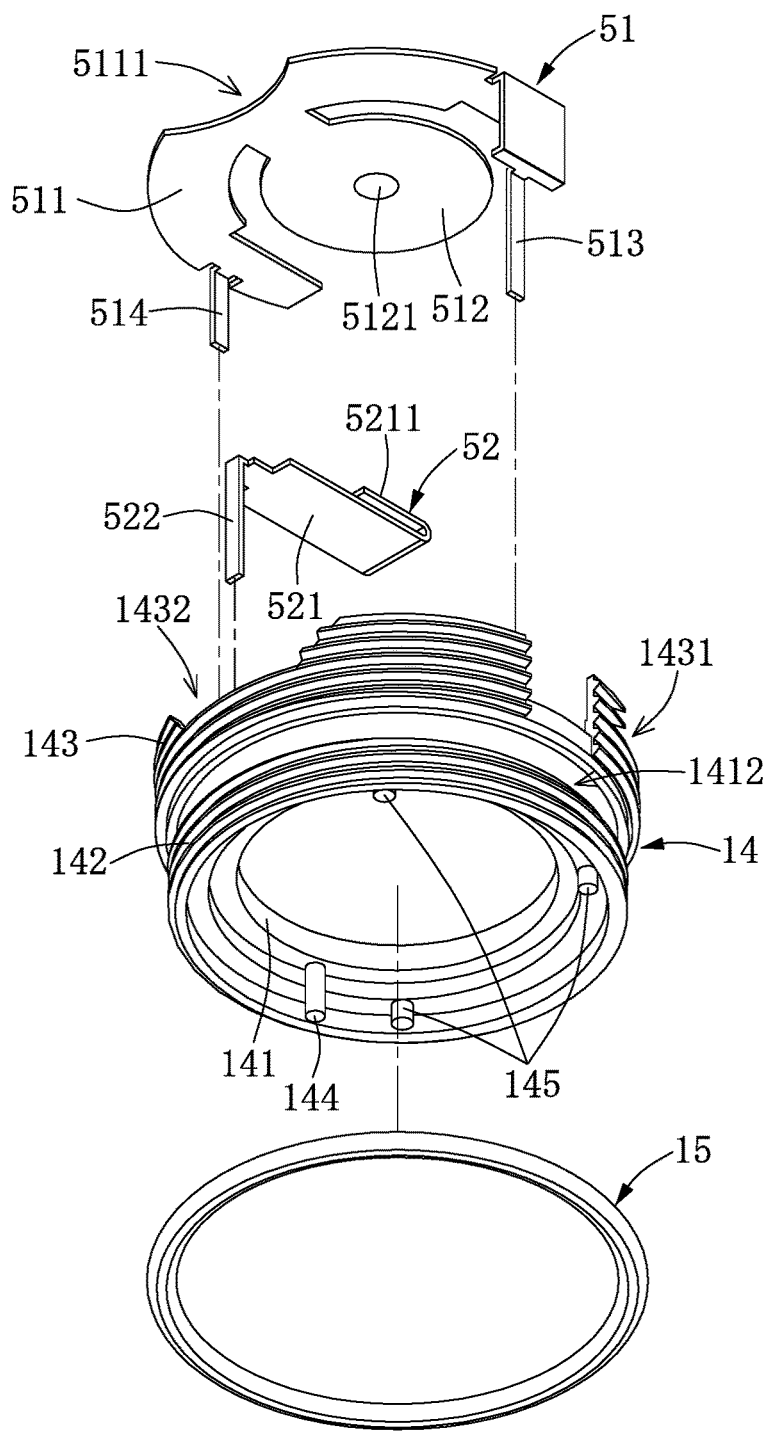
FIG. 10 is an exploded view showing part of the tire pressure monitoring device of the instant disclosure from another perspective.

As shown in FIGS. 9 and 10, and with reference occasionally made to FIGS. 7 and 8, the frame 14 has a platy base portion 141, a first combining portion 142, and a second combining portion 143. The first combining portion 142 and the second combining portion 143 are respectively extended from a periphery part of the base portion 141 in two opposite directions. The outer surface of the first combining portion 142 has a screw thread to detachably screw on the inner surface of the side wall of the trough 111 of the plastic carrier 11. The outer surface of the second combining portion 143 has a screw thread to detachably screw on an inner surface of the cover 2, which has a corresponding screw thread, so the cover 2 and the trough 111 of the plastic carrier 11 surroundingly define the accommodating space S.

The second combining portion 143 has a semi-circular gateway 1431 and an opening 1432 arranged opposing to the gateway 1431. A surface of the base portion 141 arranged inside the second combining portion 143 is formed with an elongated limiting groove 1411, and the limiting groove 1411 is recessed from a center of the surface of the base portion 141 toward the opening 1432. The base portion 141 has an annular groove 1412 recessed on a side surface thereof, and the annular groove 1412 is arranged between the first combining portion 142 and the second combining portion 143. The O-ring 15 is arranged in the annular groove 1412, and a bottom end of the cover 2 and a top end of the trough 111 of the plastic carrier 11 clamp the O-ring 15 (as shown in FIG. 7).

In addition, the frame 14 has a positioning pillar 144 and a plurality of abutting pillars 145, and the positioning pillar 144 and the abutting pillars 145 are extended from the base portion 141 and are arranged inside the first combining portion 142. Specifically, the abutting pillars 145 are entirely arranged in a space defined by the first combining portion 142, and part of the positioning pillar 144 is arranged out of the space defined by the first combining portion 142.

As shown in FIGS. 5 and 6, and with reference occasionally made to FIGS. 7 and 8, the sensing module 3 is arranged in a space defined by the trough 111. Specifically, the sensing module 3 is arranged in a space co-defined by the trough 111, the base portion 141, and the first combining portion 142. The sensing module 3 includes a circular circuit board 31, a sensor 32, and a sealing gasket 33. The circuit board 31 is disposed in the trough 111 and is electrically connected to the Bluetooth emitting module 4. The Bluetooth emitting module 4 in the instant embodiment is a Bluetooth emitter 4 mounted on the circuit board 31.

Moreover, the sensor 32 is mounted on the circuit board 31 and faces toward the airflow channel 1111. The sealing gasket 33 is sleeved at the sensor 32, and two opposite ends of the sealing gasket 33 (i.e., the top end and the bottom end of the sealing gasket 33 shown in FIG. 7) are respectively abutted against the circuit board 31 and a bottom surface 1113 of the trough 111, in other words, the end of the sealing gasket 33 arranged away from the circuit board 31 is abutted against the trough 111 for obstructing air flow out of the sealing gasket 33. Accordingly, air, which flows into the accommodating space S via the airflow channel 1111, cannot flow out of the sealing gasket 33, to provide for the sensor 32 to sense a tire pressure.

The part of the positioning pillar 144 of the frame 14, which is arranged out of the space defined by the first combining portion 142, is inserted into the circuit board 31 for maintaining the relative position between the circuit board 31 and the frame 14. The distal end of each abutting pillar 145 arranged away from the base portion 141 is abutted against the circuit board 31, thereby forcing the circuit board 31 to press the sealing gasket 33 onto the bottom surface 1113 of the trough 111.

As shown in FIGS. 9 and 10, and with reference occasionally made to FIGS. 7 and 8, the conductive module 5 is electrically connected to the circuit board 31, and the conductive module 5 is electrically connected to the sensor 32 and the Bluetooth emitting module 4 through the circuit board 31. The conductive module 5 includes a first terminal 51 and a second terminal 52, which are provided to respectively be a positive terminal and a negative terminal The first terminal 51 and the second terminal 52 are disposed on the frame 14.

Specifically, the first terminal 51 has a semi-circular main portion 511, a first touching portion 512 extended from an inner edge of the main portion 511, a first conductive arm 513, and a supporting arm 514. The first conductive arm 513 and the supporting arm 514 are respectively and perpendicularly extended from two opposite ends of the main portion 511. The main portion 511 is disposed on a distal end of the second combining portion 143 (i.e., the top end of the second combining portion 143 shown in FIG. 9) away from the base portion 141. The main portion 511, the first touching portion 512, the base portion 141, and the second combining portion 143 surroundingly define a battery receiving chamber B (as shown in FIG. 8), and the battery receiving chamber B is in air communication with the gateway 1431 and the opening 1432 of the frame 14.

Moreover, the main portion 511 has an arc-shaped notch 5111 formed on an outer edge thereof, and the notch 5111 is corresponding in position to the opening 1432 of the second combining portion 143. The first touching portion 512 is extended from the inner edge of the main portion 511, which is opposing to the notch 5111, to a circular center of the main portion 511, so the first touching portion 512 is slightly swingable by taking a connecting portion of the first touching portion 512 and the main portion 511 to be a fulcrum. At least one bump 511 is formed by punching a portion of the first touching portion 512, which is arranged at the circular center of the main portion 511, toward the base portion 141. An end of the first conductive arm 513 and an end of the supporting arm 514, which are connected to the main portion 511, are arranged in a diameter of the main portion 511. The first conductive arm 513 passes through the base portion 141 and is electrically connected to the circuit board 31, and the supporting arm 514 is engaged in the base portion 141 for supporting the main portion 511.

Figure 11:
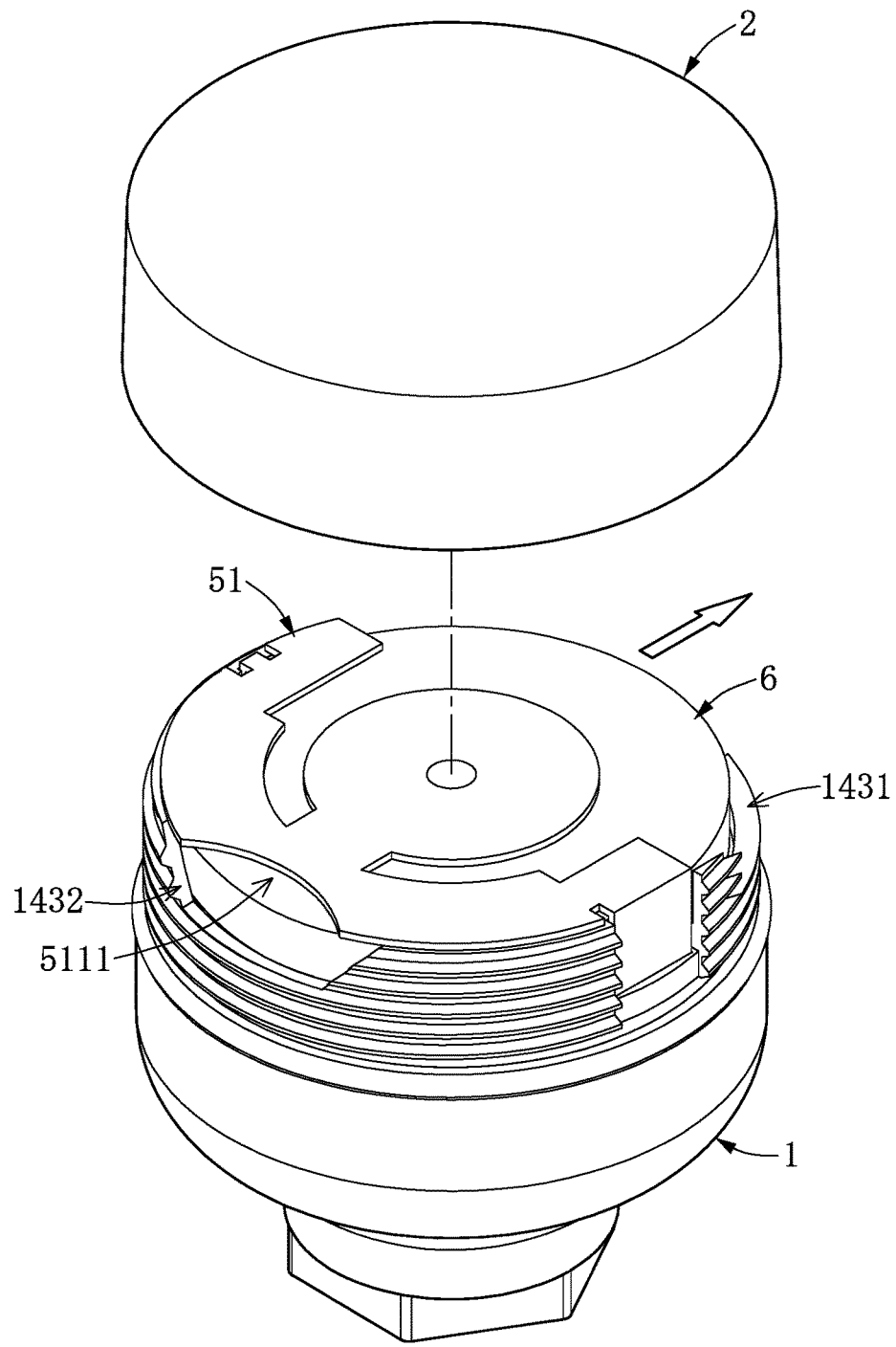
FIG. 11 is a perspective view showing the tire pressure monitoring device of the instant disclosure provided with a battery.

The second terminal 52 has a second touching portion 521 and a second conductive arm 522 perpendicularly extended from the second touching portion 521. The second touching portion 521 is disposed on the base portion 141 and is arranged in the battery receiving chamber B. Specifically, part of the second touching portion 521 is disposed in the limiting groove 1411 of the base portion 141, and the second touching portion 521 has an elastic arm 5211 arranged out of the limiting groove 1411. The bump 5121 of the first touching portion 512 and the elastic arm 5211 of the second touching portion 521 face toward each other for respectively abutting against a positive electrode and a negative electrode of a battery 6, which is received in the battery receiving chamber B (as shown in FIG. 11). The second conductive arm 522 passes through the base portion 141 and is electrically connected to the circuit board 31.

Thus, the constructions of the first terminal 51 and the second terminal 52 are provided for inserting the battery 6 into the battery receiving chamber B via the gateway 1431 of the frame 14, and two opposite surfaces of the battery 6 (i.e., the positive electrode and the negative electrode of the battery 6) are respectively abutted against the bump 5121 of the first touching portion 512 and the elastic arm 5211 of the second touching portion 521. Moreover, the battery 6 can be removed from the battery receiving chamber B via the gateway 1431 by pushing the battery 6 through the opening 1432 of the frame 14 and the notch 5111 of the first terminal 51. In addition, as shown in FIG. 11, the tire pressure monitoring device 100 can be provided with the battery 6.

[The Possible Effect of the Instant Disclosure]

In summary, the tire pressure monitoring device in the instant disclosure is provided with a plastic carrier and a metallic tube, which are formed in an single-piece structure by using an insert molding method, so a main portion of the single-piece structure is the plastic carrier for preventing electrical interference from occurring during signal transmission, and a screwing portion of the single-piece structure is a metallic tube for causing the carrier module to have a better airproof effect and a longer service life.

Moreover, for the TPMS of the instant disclosure, a user's electronic device (e.g., smart phone) can be used to be the display device by downloading a specific APP, so the user needs not to buy the conventional display device. The tire pressure monitoring device in the instant disclosure is provided with the Bluetooth emitting module to cooperate with the Bluetooth receiving module of the display device, thereby maintaining a low energy of operation.

In addition, the construction of the first terminal and the second terminal are provided for inserting the battery into the battery receiving chamber via the gateway of the frame, and the two opposite surfaces of the battery are respectively abutted against the bump of the first touching portion and the elastic arm of the second touching portion. Moreover, the battery can be removed from the battery receiving chamber via the gateway by pushing the battery through the opening of the frame and the notch of the first terminal.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A tire pressure monitoring device, comprising:
a carrier module, comprising:

a plastic carrier having a trough and a tube extended from a bottom portion of the trough, wherein the trough has an airflow channel penetratingly formed on the bottom portion thereof, and the trough is in air communication with the tube by the airflow channel; and a metallic tube seamlessly formed on an inner surface of the tube of the plastic carrier, wherein the metallic tube has an inner screw thread formed on an inner surface thereof for detachably screwing to a nozzle of a tire;

a sensing module, comprising:
 a circuit board disposed in the trough; and
 a sensor mounted on the circuit board and facing toward the airflow channel;

a cover detachably installed on the carrier module, wherein the cover and the trough of the plastic carrier surroundingly define an accommodating space; and a conductive module arranged in the accommodating space and electrically connected to the sensor of the sensing module.

2. The tire pressure monitoring device as claimed in claim 1, wherein the carrier module comprises a frame having a base portion, a first combining portion, and a second combining portion, wherein the first combining portion and the second combining portion are respectively extended from the base portion in two opposite directions, the first combining portion is detachably installed on the trough of the plastic carrier, and the second combining portion is detachably installed on the cover.

3. The tire pressure monitoring device as claimed in claim 2, wherein the second combining portion has a semi-circular gateway and an opening arranged opposing to the gateway, the conductive module comprises:

a first terminal having a semi-circular main portion and a first touching portion extended from an inner edge of the main portion, wherein the main portion is disposed on a distal end of the second combining portion away from the base portion, wherein the main portion, the first touching portion, the base portion, and the second combining portion surroundingly define a battery receiving chamber, and the battery receiving chamber is in air communication with the gateway and the opening; and a second terminal having a second touching portion, wherein the second touching portion is disposed on the base portion and is arranged in the battery receiving chamber, the first touching portion and the second touching portion face toward each other for respectively abutting against a positive electrode and a negative electrode of a battery.

4. The tire pressure monitoring device as claimed in claim 3, wherein the main portion has a notch formed on an outer edge thereof, and the notch is corresponding in position to the opening of the second combining portion, the first terminal has a first conductive arm and a supporting arm respectively extended from two opposite ends of the main portion, the first conductive arm passes through the base portion and is electrically connected to the circuit board, the supporting arm is engaged in the base portion; the second terminal has a second conductive arm curvedly extended from the second touching portion, and the second conductive arm passes through the base portion and is electrically connected to the circuit board.

5. The tire pressure monitoring device as claimed in claim 2, wherein the frame has a positioning pillar and a plurality of abutting pillars, and the positioning pillar and the abutting pillars are extended from the base portion and are arranged inside the first combining portion, the positioning pillar is inserted into the circuit board, a distal end of each abutting pillar arranged away from the base portion is abutted against the circuit board.

6. The tire pressure monitoring device as claimed in claim 2, wherein the base portion has an annular groove recessed on a side surface thereof, and the annular groove is arranged between the first combining portion and the second combining portion; the carrier module comprises an O-ring arranged in the annular groove, and the cover and the trough of the plastic carrier clamp the O-ring.

7. The tire pressure monitoring device as claimed in claim 1, wherein the plastic carrier has an airflow pipe extended from the bottom portion of the tough, the airflow pipe is arranged in the tube and is in air communication with the airflow channel, the bottom portion of the trough has an engaging groove arranged adjacent to the airflow pipe; the carrier module comprises a buffering gasket sleeved at the airflow pipe and partially engaged in the engaging groove.

8. The tire pressure monitoring device as claimed in claim 1, wherein the sensing module has a sealing gasket sleeved at the sensor, an end of the sealing gasket arranged away from the circuit board is abutted against the trough for obstructing air flow out of the sealing gasket.

9. A carrier module of a tire pressure monitoring device, comprising:

a plastic carrier having a trough and a tube extended from a bottom portion of the trough, wherein the trough has an airflow channel penetratingly formed on the bottom portion thereof, and the trough is in air communication with the tube by the airflow channel; and a metallic tube seamlessly formed on an inner surface of the tube of the plastic carrier, wherein the metallic tube has an inner screw thread formed on an inner surface thereof for detachably screwing to a nozzle of a tire.

10. The carrier module as claimed in claim 9, wherein the plastic carrier has an airflow pipe extended from the bottom portion of the trough, the airflow pipe is arranged in the tube and is in air communication with the airflow channel, the bottom portion of the trough has an engaging groove arranged adjacent to the airflow pipe; the carrier module comprises a buffering gasket sleeved at the airflow pipe and partially engaged in the engaging groove.

* * * * *